United States Patent [19]

Cuda

[11] Patent Number: 4,773,723
[45] Date of Patent: Sep. 27, 1988

[54] HEAT SINK STRUCTURE FOR A FIBER OPTIC LIGHT SOURCE

[76] Inventor: Joseph Cuda, 2937 Christopher Creek Rd. North, Jacksonville, Fla. 32217

[21] Appl. No.: 30,125

[22] Filed: Mar. 26, 1987

[51] Int. Cl.[4] .................. G02B 6/36; F21V 7/04; H01B 7/34; F28F 3/12
[52] U.S. Cl. .................. 350/96.20; 350/96.10; 350/96.22; 350/96.23; 362/32; 174/16 HS; 165/53; 165/89; 165/169
[58] Field of Search .......... 350/96.20, 96.10, 96.21, 350/96.23, 96.22, 96.24, 96.25, 96.29; 250/227; 362/32; 174/16 HS; 357/81, 84, 85; 165/53, 89, 168, 169, 186

[56] References Cited

U.S. PATENT DOCUMENTS

| | | | |
|---|---|---|---|
| 243,115 | 1/1977 | Ziegler et al. | D26/27 X |
| 250,480 | 12/1978 | Wettermann et al. | D24/8 |
| 252,282 | 7/1979 | Wettermann et al. | D24/8 |
| 3,382,353 | 5/1968 | Wappler | 362/32 X |
| 3,638,013 | 1/1972 | Keller | 362/32 X |
| 3,775,606 | 11/1973 | Bazell et al. | 362/32 X |
| 3,831,017 | 8/1974 | Auer | 350/96.20 |
| 4,025,776 | 5/1977 | Cawood et al. | 350/96.24 X |
| 4,286,196 | 8/1981 | Auer | 315/307 |
| 4,547,039 | 10/1985 | Caron et al. | 350/96.20 |
| 4,557,554 | 12/1985 | Blanc | 350/96.20 |
| 4,605,280 | 8/1986 | Welber et al. | 350/96.20 |
| 4,613,931 | 9/1986 | Messinger | 362/32 X |
| 4,704,660 | 11/1987 | Robbins | 362/32 |

*Primary Examiner*—William L. Sikes
*Assistant Examiner*—Brian M. Healy
*Attorney, Agent, or Firm*—Banner, Birch, McKie & Beckett

[57] ABSTRACT

A fiber optic light source is disclosed that comprises a three part heat sink structure for absorbing and transmitting heat out of the interior of the light source to thereby reduce the possibility of heat damage. The heat sink structure comprises an internal stationary heat sink in thermal contact with external stationary and movable heat sinks. The movable heat sink acts as a turret which functions to align fiber optic cables with one or more light sources.

12 Claims, 3 Drawing Sheets

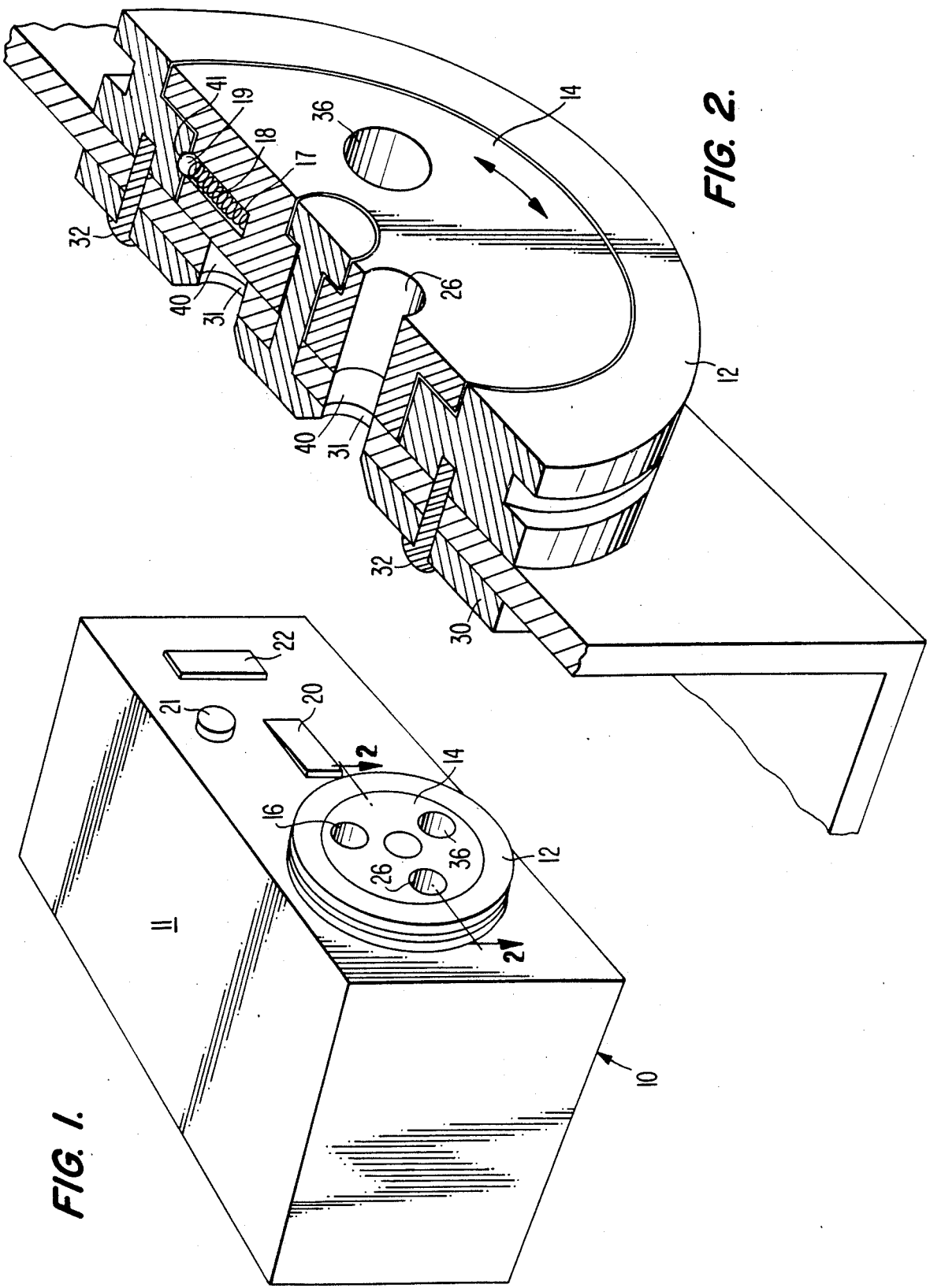

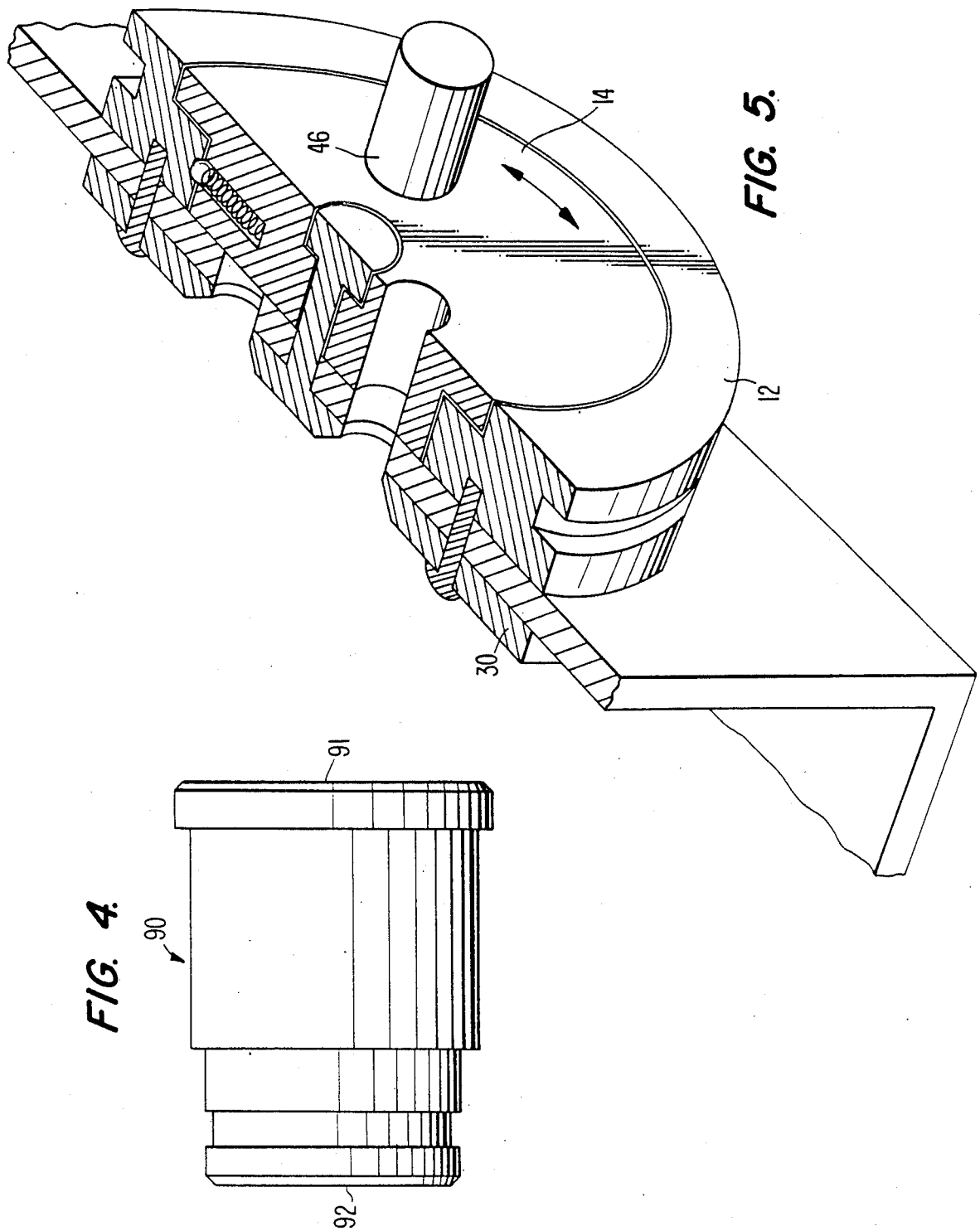

HEAT SINK STRUCTURE FOR A FIBER OPTIC LIGHT SOURCE

BACKGROUND OF THE INVENTION

This invention relates to a fiber optic light source for illuminating the receptor end of a fiber optic cable.

Fiber optic cables are used to transmit light for a variety of purposes. A typical cable consists of a receptor end designed to be illuminated by a light source, the opposite end being adapted to receive a light emitter. Light travels from the light source through the fiber optic cable and is emitted by the light emitter. Light emitters are frequently used in medical applications to illuminate inaccessible areas.

A typical fiber optic light source is disclosed in U.S. Pat. No. 3,831,017 to Auer and comprises a cabinet containing two light sources which direct light towards a plurality of openings in the cabinet. A selector turret is positioned on the outside of the cabinet in the immediate proximity of the cabinet openings, and comprises four different light ports into which the receptor end of a fiber optic cable may be inserted. By rotating the turret, the light ports are aligned with the different openings in the cabinet and therefore different light sources. Using such a structure, various fiber optic cables may be quickly and easily aligned with a chosen light source, and the illuminated cable may be changed by merely rotating the turret without having to continually remove and replace the fiber optic cable.

A fiber optic light source such as the one disclosed by Auer will frequently suffer from problems relating to overheating of the device. The light sources required for typical fiber optic applications are high intensity light sources that generate a significant amount of heat. As the temperature of the device rises, the receptor end of the fiber optic cable will frequently be damaged or destroyed.

U.S. Pat. No. 4,557,554 to Blanc discloses an apparatus designed to reduce the possibility of the fiber optic cable being damaged due to heat generated by the light source. Blanc uses a plurality of "cooling jaws" located immediately adjacent the receptor plug on the inside of the cabinet. Blanc's cooling jaws are intended to conduct heat away from the fiber optic cable. Since Blanc's cooling jaws are located on the inside of the cabinet, any heat conducted away from the fiber optic cable remains trapped within the cabinet. Eventually the entire interior of the cabinet will become overheated and the efficiency of the cooling jaws will be reduced allowing the fiber optic cable to overheat.

SUMMARY OF THE INVENTION

It is, therefore, the primary object of this invention to prevent heat damage to a fiber optic cable due to overheating of a fiber optic light source.

It is another object of the invention to efficiently transfer heat from the interior of a fiber optic light source cabinet to the surrounding environment.

According to the invention, there is provided a fiber optic light source comprising an improved heat sink structure that efficiently absorbs and conducts heat out of the interior of the cabinet. The heat sink structure comprises an internal heat sink in thermal contact with an external heat sink. The external heat sink comprises an outer stationary portion and an inner rotatable portion which functions as a turret selector. The turret selector comprises a plurality of light ports into which the receptor end of a fiber optic cable may be inserted. By rotating the turret, a chosen fiber optic cable may be aligned with a chosen light source. Since the internal and external heat sinks are in thermal contact with each other, heat generated by the light source will be absorbed and conducted out of the cabinet thereby reducing the internal temperature of the cabinet and preventing heat damage to the fiber optic cable.

BRIEF DESCRIPTION OF THE DRAWINGS

FIG. 1 is a perspective view of the fiber optic light source according to the present invention;

FIG. 2 is a partial cut-away portion of the device shown in FIG. 1;

FIG. 4 illustrates a port adaptor used with the present invention; and

FIG. 5 illustrates a fiber optic light source that includes a handle for facilitating rotation of the turret.

DETAILED DESCRIPTION OF THE PREFERRED EMBODIMENT

Figure 3:
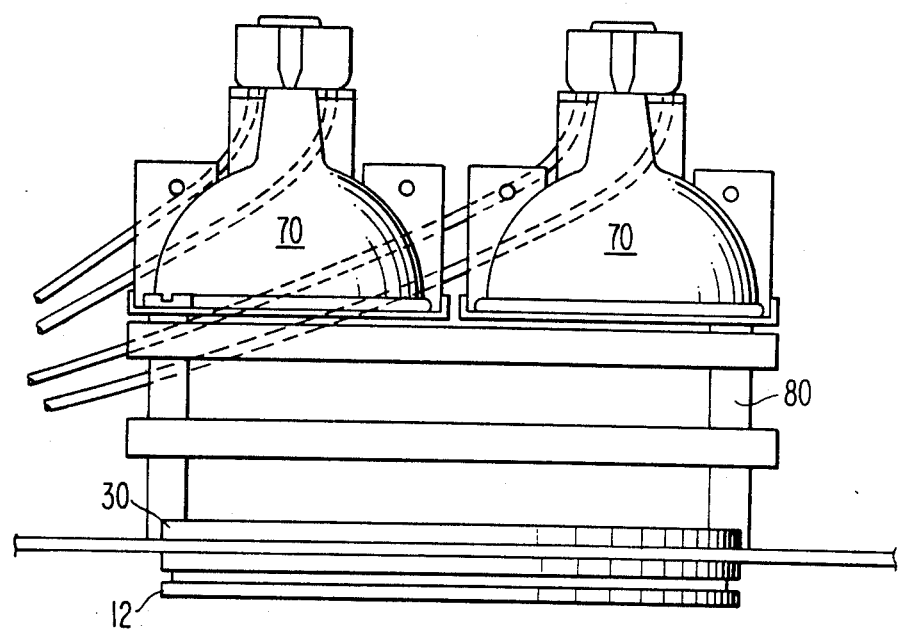
FIG. 3 is a top sectional view of the device shown in FIG. 1.

The fiber optic light source of the present invention is illustrated in FIG. 1 and indicated generally as 10. The device includes a cabinet 11, an external stationary heat sink 12 and an external movable heat sink 14. Movable heat sink 14 functions as a selector turret and comprises a plurality of fiber optic light ports 16, 26, 36 of various sizes into which the receptor end of fiber optic cables of various sizes (not shown) may be inserted. The device includes a power switch 20 and indicator lights 21, 22.

FIG. 2 is a sectional view of FIG. 1 taken along line 2—2. An internal heat sink 30 is positioned on the interior of the cabinet immediately adjacent external heat sinks 12 and 14. The heat sinks are attached by means of pins 32. Movable heat sink 14 is rotationally movable within a circular well in the center of stationary heat sink 12. By rotating movable heat sink 14, each of the light ports 16, 26, 36 may be aligned with a corresponding opening 40 in cabinet 11. Internal heat sink 30 comprises a plurality of openings 31 that correspond to openings 40 to thereby provide a light path for light generated by internal light sources 70 (see FIG. 3). In order to insure accurate alignment of one of light ports 16, 26, 36 with one of openings 31, 40, movable portion 14 is provided with a plurality of recessed holes 17 each of which contains a spring 18 and a small metallic ball 19. As movable portion 14 rotates, ball 19 travels along a groove (not shown) on the interior of stationary portion 12. A plurality of positioned stops 41 are located in the groove in stationary portion 12 such that the spring-loaded ball 19 will engage one of stops 41 when one of light ports 16, 26, 36 is aligned with one of openings 31, 40.

FIG. 3 illustrates an overhead view of the invention and shows two light sources 70 which will provide light to a properly aligned fiber optic cable. The light sources are attached to the interior of the cabinet by means of bracket 80.

Although only three light ports are shown in the present embodiment, it may be desirable to utilize more than three different sizes of fiber optic cable receptor plugs. Additional light ports could be included in movable turret 14 but the number is limited since, if too many light ports are included, light might leak into light ports adjacent the one being utilized. In order to facilitate the use of an unlimited number of different size receptor plugs, a variety of light port adaptors 90 may be utilized. Such an adaptor is illustrated in FIG. 4, and includes a light port 91 that receives the receptor end of a fiber optic cable and a plug end 92 that is designed to fit into one of light ports 16, 26, 36. A variety of such adaptors may be provided with ports 91 of varying sizes to allow any number of different fiber optic cables to be utilized with the present invention.

Adapter 90 may also be utilized as a handle to facilitate the rotation of turret 14. The adaptor would simply be inserted into one of light ports 16, 26, 36 and used as a handle to turn turret 14. Alternatively, a handle may be built into turret 14 by extending one of light ports 16, 26, 36 out from the front surface of turret 14. A light port that has been extended in this manner is illustrated in FIG. 5 and indicated as 46. It may be desirable to place a heat shield on the surface of handle 46, the shield being formed of a material such as Delrin. Delrin is a known material with heat conductive properties. The use of the heat shield will keep the handle cool enough to use.

In accordance with the present invention, heat generated by light sources 70 will be absorbed by the three part heat sink structure and conducted out of the interior of the cabinet. The close proximity of interior heat sink 30 to external heat sinks 12 and 14 provides sufficient thermal contact therebetween to efficiently transfer heat from the interior of the cabinet to the surrounding atmosphere. In this way, the fiber optic cables will not overheat and become damaged.

Various changes may be made within the purview of this invention in the form, detail, proportions and arrangement of parts without departing from the spirit of the invention, and no undue limitations are to be inferred or implied from the foregoing disclosure.

I claim:

1. In a fiber optic light source for illuminating a fiber optic cable, including a cabinet and one or more light sources disposed within said cabinet for providing light, said cabinet being provided with one or more cabinet openings through which said light may pass, the improvement comprising an external heat sink adjoining the outside of said cabinet in the proximity of said openings and comprising a stationary portion and a movable portion rotatably disposed within said stationary portion, said movable portion comprising one or more openings into which said fiber optic cable may be inserted such that rotation of said movable portion will alternately align said fiber optic cable with each of said cabinet openings to thereby provide light to said fiber optic cable, said external heat sink functioning to absorb and conduct heat out of said cabinet to thereby preventing heat damage to either the fiber optic light source or the fiber optic cable.

2. A fiber optic light source according to claim 1 further comprising an internal heat sink adjoining the inside surface of said cabinet and in thermal contact with said external heat sink.

3. A fiber optic light source according to claim 2 wherein said internal heat sink comprises one or more openings corresponding to said cabinet openings and through which said light may pass.

4. A fiber optic light source according to claim 1 wherein said movable portion comprises a plurality of openings of various sizes to accommodate fiber optic cables of various sizes.

5. A fiber optic light source according to claim 1 wherein said movable portion is substantially cylindrically shaped and rotates within a cylindrical well in the center of said stationary portion.

6. A fiber optic light source according to claim 1 wherein said movable portion comprises one or more recessed holes containing a spring loaded ball which is in contact with a groove in said stationary portion and which will engage one or more position stops as said movable portion is rotated to thereby accurately align said openings in said movable portion with said cabinet openings.

7. A fiber optic light source according to claim 2 wherein said internal and external heat sinks are connected by a pin that passes through one of said heat sinks and through said cabinet into the other of said heat sinks.

8. A fiber optic light source according to claim 1 further comprising an adaptor which fits onto one of said openings in said movable portion and which comprises an opening of a size different than the size of said opening into which said adaptor is inserted, said opening in said adaptor designed to receive a fiber optic such that light may be transmitted to said fiber optic cable.

9. A fiber optic light source according to claim 1 further comprising an extended portion extending from the surface of said movable portion, said extended portion usable as a handle to move said movable portion.

10. A fiber optic light source according to claim 9 wherein said extended portion comprises an opening to receive a fiber optic cable such that light may be transmitted to said fiber optic cable.

11. A fiber optic light source according to claim 9 wherein said extended portion comprises a heat shield on the outer surface of said extended portion.

12. A fiber optic light source according to claim 11 wherein said heat shield is formed of Delrin.

* * * * *